US009361237B2

(12) United States Patent
Liu et al.

(10) Patent No.: US 9,361,237 B2
(45) Date of Patent: Jun. 7, 2016

(54) SYSTEM AND METHOD FOR EXCLUSIVE READ CACHING IN A VIRTUALIZED COMPUTING ENVIRONMENT

(71) Applicant: VMware, Inc., Palo Alto, CA (US)

(72) Inventors: Deng Liu, Mountain View, CA (US); Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 13/655,237

(22) Filed: Oct. 18, 2012

(65) Prior Publication Data

US 2014/0115256 A1 Apr. 24, 2014

(51) Int. Cl.
*G06F 12/08* (2016.01)
*G06F 12/12* (2016.01)

(52) U.S. Cl.
CPC ........ *G06F 12/0866* (2013.01); *G06F 12/0897* (2013.01); *G06F 12/121* (2013.01); *G06F 12/123* (2013.01); *G06F 12/126* (2013.01)

(58) Field of Classification Search
CPC ............ G06F 12/0866; G06F 12/0897; G06F 12/126; G06F 12/123; G06F 12/121; G06F 3/0641; G06F 17/30156
See application file for complete search history.

(56) References Cited

U.S. PATENT DOCUMENTS 6,356,996 B1 3/2002 Adams
6,460,122 B1 * 10/2002 Otterness et al. ............. 711/154
6,789,156 B1 * 9/2004 Waldspurger ..................... 711/6
7,917,699 B2 * 3/2011 Kim .................... G06F 12/0811 711/100
2002/0078310 A1 * 6/2002 Frank et al. .................. 711/148
2005/0193160 A1 9/2005 Bhatt et al.
2006/0143394 A1 * 6/2006 Petev et al. ................... 711/133
2007/0094450 A1 * 4/2007 VanderWiel .................. 711/133
2008/0059707 A1 * 3/2008 Makineni ............. G06F 12/128 711/122
2009/0024796 A1 * 1/2009 Nychka et al. ................ 711/122
2010/0299667 A1 * 11/2010 Ahmad et al. .................... 718/1
2011/0022773 A1 * 1/2011 Rajamony et al. ................ 711/3
2011/0055827 A1 3/2011 Lin et al.

OTHER PUBLICATIONS

S. T. Jones, A. C. Arpaci-Dusseau, and R. H. Arpaci-Dusseau. Geiger: monitoring the buffer cache in a virtual machine environment. In Proceedings of the International Conference on Architectural Support for Programming Languages and Operating Systems (ASPLOS), 2006.*

(Continued)

*Primary Examiner* — Kevin Verbrugge
*Assistant Examiner* — Francisco Grullon
(74) *Attorney, Agent, or Firm* — Patterson & Sheridan LLP

(57) ABSTRACT

A technique for efficient cache management demotes a unit of data from a higher cache level to a lower cache level in a cache hierarchy when the higher level cache evicts the unit of data. In a virtualization computing environment, eviction of the unit of data may be inferred by observing privileged memory and disk operations performed by a guest operating system and trapped by virtualization software for execution. When the unit of data is inferred to be evicted, the unit of data is demoted by transferring the unit of data into the lower cache level. This technique enables exclusive caching without direct involvement or modification of the guest operating system. In alternative embodiments, a pseudo-driver installed within the guest operating system explicitly tracks memory operations and transmits page eviction information to the lower level cache, which is able to cache evicted pages while maintaining cache exclusivity.

20 Claims, 6 Drawing Sheets

(56) References Cited

OTHER PUBLICATIONS

T. M. Wong and J. Wilkes. My Cache or Yours? Making Storage More Exclusive. In Proceedings of the USENIX Annual Technical Conference (USENIX '02), Monterey, California, Jun. 2002.*
D.Boutcher, A. Chandra Practical Techniques for Eliminating Storage of Deleted Data, University of Minnesota, Mar. 20, 2007.*
M. Canim, G. Mihala, B. Bhattacharjee, K. Ross, C. Lang SSD Bufferpool Extensions for Database Systems, Proceedings of the VLDB Endowment, vol. 3, No. 2, 2010.*
C.Waldspurger Memory Resource Management in VMware ESX Server, OSDI '02, Dec. 2002.*
P.Lu, K.Shen Virtual Machine Memory Access Tracing With Hypervisor Exclusive Cache, USENIX 2007.*
Z. Chen, Y. Zhou, and K. Li. Eviction based placement for storage caches. In Proc. of the USENIX Annual Technical Conf., pp. 269-282, San Antonio, TX, Jun. 2003.*
International Search Report and Written Opinion mailed Jan. 31, 2014, Intemaional Application No. PCT/US2013/064940, filed Oct. 15, 2013, 10 pages.
Australian Office Action dated Feb. 10, 2016 in counterpart Australian Patent Application 2013331547.

* cited by examiner

SYSTEM AND METHOD FOR EXCLUSIVE READ CACHING IN A VIRTUALIZED COMPUTING ENVIRONMENT

BACKGROUND

Virtualized computing environments provide tremendous efficiency and flexibility for system operators by enabling computing resources to be deployed and managed as needed to accommodate specific applications and capacity requirements. As virtualized computing environments mature and achieve broad market acceptance, demand continues for increased performance of virtual machines (VMs) and increased overall system efficiency. A typical virtualized computing environment includes one or more host computers, one or more storage systems, and one or more networking systems configured to couple the host computers to each other, the storage systems, and a management server. A given host computer may execute a set of VMs, each typically configured to store and retrieve file system data within a corresponding storage system. Relatively slow access latencies associated with mechanical hard disk drives comprising the storage system give rise to a major bottleneck in file system performance, reducing overall system performance.

One approach for improving system performance involves implementing a buffer cache for a file system running in a guest operating system (OS). The buffer cache is stored in machine memory (i.e., physical memory configured within a host computer; also referred to as random access memory or RAM) and is therefore limited in size compared to the overall storage capacity available within the storage systems. While machine memory provides a significant performance advantage over the storage systems, this size limitation has a net effect of reducing system performance because certain units of storage may be evicted from the buffer cache prior to a subsequent access. Once a unit of storage is evicted from the buffer cache, accessing that same unit of storage again typically requires an additional low performance access to the corresponding storage system.

A RAM-based file system buffer cache is a common way of improving the input/output (IO) performance in guest operating systems, but the improvement of the performance is limited by the high price and limited density of RAM memory. As flash-based solid state drives (SSDs) emerge as new storage media with much higher input/output operations per second than hard disk drives and lower price than RAM, they are being broadly deployed as a second-level read cache in virtualized computing environments, e.g., in the virtualization software known as a hypervisor. As a result, multiple levels of caching layers are formed in the storage IO stack of the virtualized computing environment.

In virtualized computing environments, the different caching layers as described above typically and purposefully do not communicate, rendering conventional techniques for achieving cache exclusivity inapplicable. As such, the second-level cache typically does provide improved read performance, but identical data may be cached in both the buffer cache and the second-level cache, reducing overall effective cache size and cost-efficiency. Although conventional caching techniques do improve read performance, adding an additional layer of caching in a virtualized environment results in a decrease in storage utilization efficiency due to redundant storage of cached data.

SUMMARY

One or more embodiments disclosed herein generally provide methods and systems for managing cache storage in a virtualized computing environment and more particularly provide methods and systems for exclusive read caching in a virtualized computing environment.

In one embodiment, a buffer cache within a guest operating system provides a first caching level, and a hypervisor cache provides a second caching level. When a given unit of data is loaded and cached by the guest operating system into the buffer cache, the hypervisor cache records related state but does not actually cache the unit of data. The hypervisor cache only caches the unit of data when the buffer cache evicts the unit of data, triggering a demotion operation that copies the unit of data to the hypervisor cache.

A method for caching units of data between a first caching level buffer and a second caching level buffer, according to an embodiment, includes the steps of: in response to receiving a request to store contents of a first storage block into a machine page of a first caching level buffer associated with a physical page number (PPN), determining whether or not a unit of data cached in the first caching level buffer can be demoted to the second caching level; demoting the unit of data to the second caching level buffer; updating the state information of units of data cached in the first and second caching level buffers; and storing the contents of the first storage block into the first caching level buffer at the PPN.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
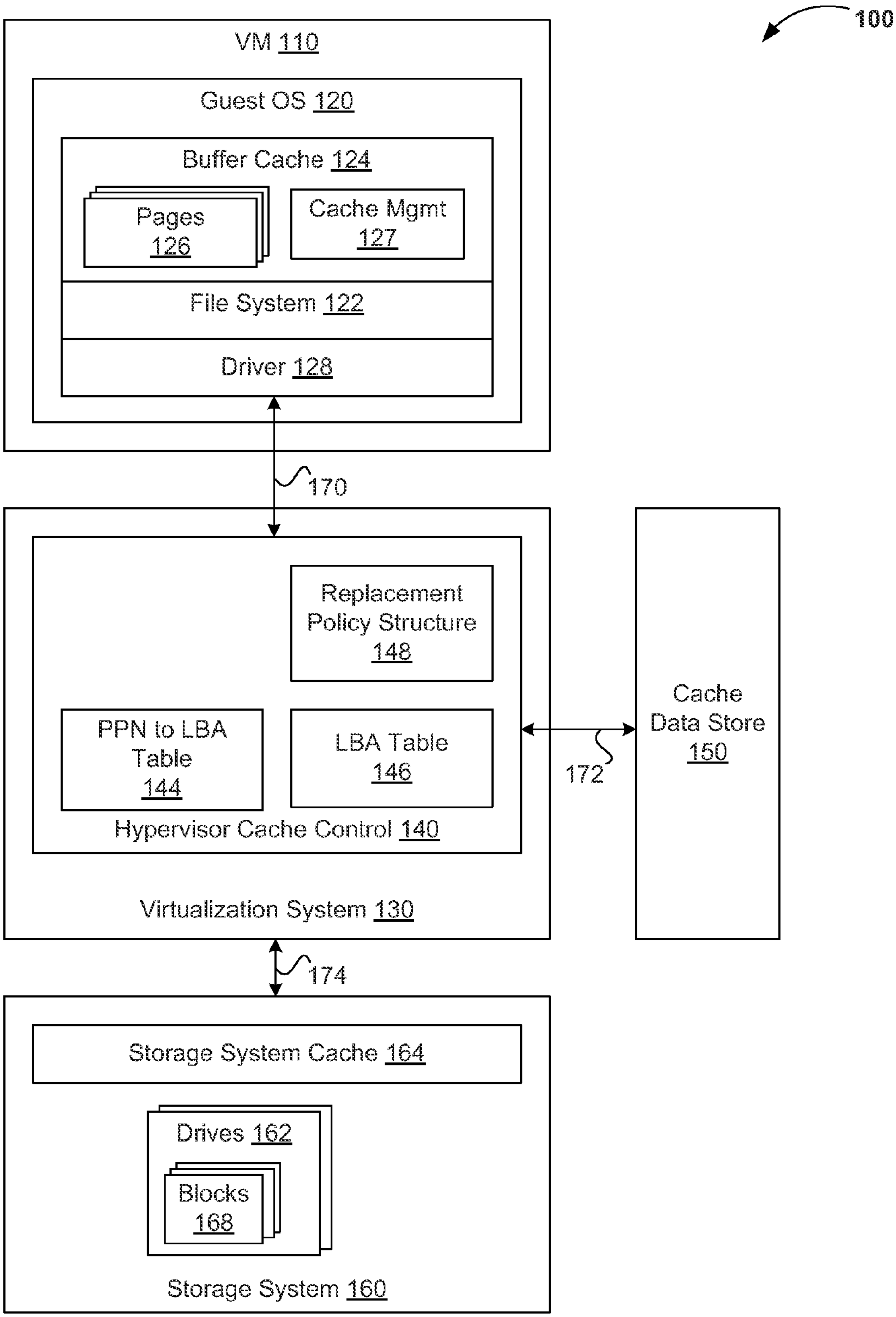
FIGS. 1A and 1B are block diagrams of a virtualized computing system configured to implement multi-level caching, according to embodiments.

FIG. 1A is a block diagram of a virtualized computing system 100 configured to implement multi-level caching, according to one embodiment. Virtualized computing system 100 includes a virtual machine (VM) 110, a virtualization system 130, a cache data store 150, and a storage system 160. VM 110 and virtualization system 130 may execute in a host computer.

In one embodiment, storage system 160 comprises a set of storage drives 162, such as mechanical hard disk drives or solid-state drives (SSDs), configured to store and retrieve blocks of data. Storage system 160 may present one or more logical storage units, each comprising a set of one or more data blocks 168 residing on storage drives 162. Blocks within a given logical storage unit are addressed using an identifier for the logical storage unit and a unique logical block address (LBA) from a linear address space of different blocks. A logical storage unit may be identified by a logical unit number (LUN) or any other technically feasible identifier. Storage system 160 may also include a storage system cache 164, comprising storage devices that are able to perform access operations at higher speeds than storage drives 162. For example, storage system cache 164 may comprise dynamic random access memory (DRAM) or SSD storage devices, which provide higher performance than mechanical hard disk drives typically used as storage drives 162. Storage subsystem 160 includes an interface 174 through which access requests to blocks 168 are processed. Interface 174 may define many levels of abstraction, from physical signaling to protocol signaling. In one embodiment, interface 174 implements the well-known Fibre Channel (FC) specification for block storage devices. In another embodiment, interface 174 implements the well-known Internet small computer system interface (iSCSI) protocol over a physical Ethernet port. In other embodiments, interface 174 may implement serial attached small computer systems interconnect (SAS) or serial attached advanced technology attachment (SATA). Furthermore, interface 174 may implement any other technically feasible block-level protocol without departing the scope and spirit of embodiments of the present invention.

VM 110 provides a virtual machine environment in which a guest OS (GOS) 120 may execute. The well-known Microsoft WINDOWS® operating system and the well-known LINUX® operating system are examples of a GOS. To reduce access latency associated with mechanical hard disk drives, GOS 120 implements a buffer cache 124, which caches data that is backed by storage system 160. Buffer cache 124 is conventionally stored within machine memory of the host computer for high-performance access to the cached data, which is organized as a plurality of pages 126 that map to corresponding blocks 168 residing within storage system 160. File system 122 is also implemented within GOS 120 to provide a file service abstraction, which is conventionally availed to one or more applications executing under GOS 120. File system 122 maps a file name and file position to one or more blocks of storage within the storage system 160.

Buffer cache 124 includes a cache management subsystem 127 that manages which blocks 168 are cached as pages 126. Each different block 168 is addressed by a unique LBA and each different page 126 is addressed by a unique physical page number (PPN). In the embodiments described herein, the physical memory space for a particular VM, e.g., VM 110, is divided into physical memory pages, and each of the physical memory pages has a unique PPN by which it can be addressed. In addition, the machine memory space of virtualized computing system 100 is divided into machine memory pages, and each of the machine memory pages has a unique machine page number (MPN) by which it can be addressed, and the hypervisor maintains a mapping of the physical memory pages of the one or more VMs running in virtualized computing system 100 to the machine memory pages. Cache management subsystem 127 maintains a mapping between each cached LBA and a corresponding page 126 that caches file data corresponding to the LBA. This mapping enables buffer cache 124 to efficiently determine whether an LBA associated with a particular file descriptor has a valid mapping to a PPN. If a valid LBA-to-PPN mapping exists, then data for a requested block of file data is available from a cached page 126. Under normal operation, certain pages 126 need to be replaced to cache more recently requested blocks 168. Cache management subsystem 127 implements a replacement policy to facilitate replacing pages 126. One example of a replacement policy is referred to in the art as least recently used (LRU). Whenever a page 126 needs to be replaced, an LRU replacement policy selects the least recently accessed (used) page to be replaced. A given GOS 120 may implement an arbitrary replacement policy that may be proprietary.

File access requests posted to file system 122 are completed by either accessing corresponding file data residing in pages 126 or by performing one or more access requests that target storage system 160. Driver 128 executes detailed steps needed to perform the access request based on specification details of interface 170. For example, interface 170 may comprise an iSCSI adapter, which is emulated by VM 110 in conjunction with virtualization system 130. Each access request may comprise an access request that targets storage system 160. In such a scenario, driver 128 manages an emulated iSCSI interface to perform a request to read a particular block 168 into a page 126, specified by a corresponding PPN.

Virtualization system 130 provides memory, processing, and storage resources to VM 110 for emulating an underlying hardware machine. In general, this emulation of a hardware machine is indistinguishable to GOS 120 from an actual hardware machine. For example, an emulation of an iSCSI interface acting as interface 170 is indistinguishable to driver 128 from an actual hardware iSCSI interface. Driver 128 typically executes as a privileged process within GOS 120. However, GOS 120 actually executes instructions in an unprivileged mode of the processor within the host computer. As such, a virtual machine monitor (VMM) associated with virtualization system 130 needs to trap privileged operations, such as page table updates, disk read and disk write operations, etc., and perform the privileged operations on behalf of GOS 120. Trapping these privileged operations also presents an opportunity to monitor certain operations being performed by GOS 120.

Virtualization system 130, also known in the art as a hypervisor, includes a hypervisor cache control 140, which is configured to receive access requests from GOS 120 and to transparently process the access requests targeting storage system 160. In one embodiment, write requests are monitored but otherwise passed through to storage system 160. Read requests for data cached within cache data store 150 are serviced by hypervisor cache control 140. Such read requests are referred to as cache hits. Read requests for data that is not cached within cache data store 150 are posted to storage system 160. Such read requests are referred to as cache misses.

Cache data store 150 comprises storage devices that are able to perform access operations at higher speeds than storage drives 162. For example, cache data store 150 may comprise DRAM or SSD storage devices, which provide higher performance than mechanical hard disk drives typically used to implement storage drives 162. Cache data store 150 is coupled to the host computer via interface 172. In one embodiment, cache data store 150 comprises solid-state storage devices and interface 172 comprises the well-known PCI-express (PCIe) high-speed system bus interface. The solid-state storage devices may include DRAM, static random access memory (SRAM), flash memory, or any combination thereof. In this embodiment, cache data store 150 may perform reads with higher performance than storage system cache 164 because interface 172 is inherently faster with lower latency than interface 174. In alternative embodiments, interface 172 implements a FC interface, serial attached small computer systems interconnect (SAS), serial attached advanced technology attachment (SATA), or any other technically feasible data transferring technology. Cache data store 150 is configured to advantageously provide requested data to hypervisor cache control 140 with lower latency than performing a read request to storage system 160.

Hypervisor cache control 140 presents a storage system protocol to interface 170, enabling storage device driver 128 in VM 110 to transparently interact with hypervisor cache control 140 as though interacting with storage system 160. Hypervisor cache control 140 intercepts access IO requests targeting storage system 160 via privileged instruction trapping by the VMM. The access requests typically comprise a request to load data contents of an LBA associated with storage system 160 into a PPN associated with virtualized physical memory associated with VM 110.

An association between a specific PPN and a corresponding LBA is established by an access request of the form "read_page(PPN, deviceHandle, LBA, len)," where "PPN" is a target PPN, "deviceHandle" is a volume identifier such as a LUN, "LBA" specifies a starting block within the deviceHandle, and "len" specifies a length of data to be read by the access request. A length exceeding one page may result in multiple blocks 168 being read into multiple corresponding PPNs. In such a scenario, multiple associations may be formed between corresponding LBAs and PPNs. These associations are tracked in PPN-to-LBA table 144, which stores each association between a PPN and an LBA in the form of {PPN, (deviceHandle, LBA)}, indexed by PPN. In one embodiment, PPN-to-LBA table 144 is implemented using a hash table for efficient lookup, and every entry is association with a checksum, such as an MD5 checksum calculated from the content of the cached data. PPN-to-LBA table 144 is used for inferring and tracking what has been cached in the buffer cache 124 within GOS 120.

Cache LBA table 146 is maintained to track what has been cached in cache data store 150. Each entry is in the form of {(deviceHandle, LBA), address_in_data_store} indexed by (deviceHandle, LBA). In one embodiment, cache LBA table 146 is implemented using a hash table and the parameter "address_in_data_store" is used to address data for a cached block within cache data store 150. Any technically feasible addressing scheme may be implemented and may depend on implementation details of cache data store 150. Replacement policy data structure 148 is maintained to implement a replacement policy of data cached within cache data store 150. In one embodiment, replacement policy data structure 148 is an LRU list, with each list entry comprising a descriptor of each block cached within cache data store 150. When an entry is accessed, the entry is pulled from its position within the LRU list and placed at the head of the list, representing the entry is the current most recently used (MRU) entry. An entry at the LRU list tail is the least recently used entry and the entry to be evicted when a new, different block needs to be cached within cache data store 150.

Embodiments implemented using FIG. 1A may monitor block access requests generated in buffer cache 124 that target storage system 160. Hypervisor cache control 140 is able to infer which blocks of data are being cached within buffer cache 124 by tracking PPN-to-LBA mappings using PPN-to-LBA table 144. Hypervisor cache control 140 is then able to manage cache data store 150 to minimize duplication of cached data between buffer cache 124 and cache data store 150. When two caches in a cache hierarchy have minimal or no duplicated data they are referred to as exclusive. A mechanism of data demotion is used to implement exclusivity, whereby a unit of data is demoted to a different cache rather than being overwritten during eviction of the data from a corresponding data store. Demotion is discussed in greater detail below in FIG. 2.

Figure 1B:
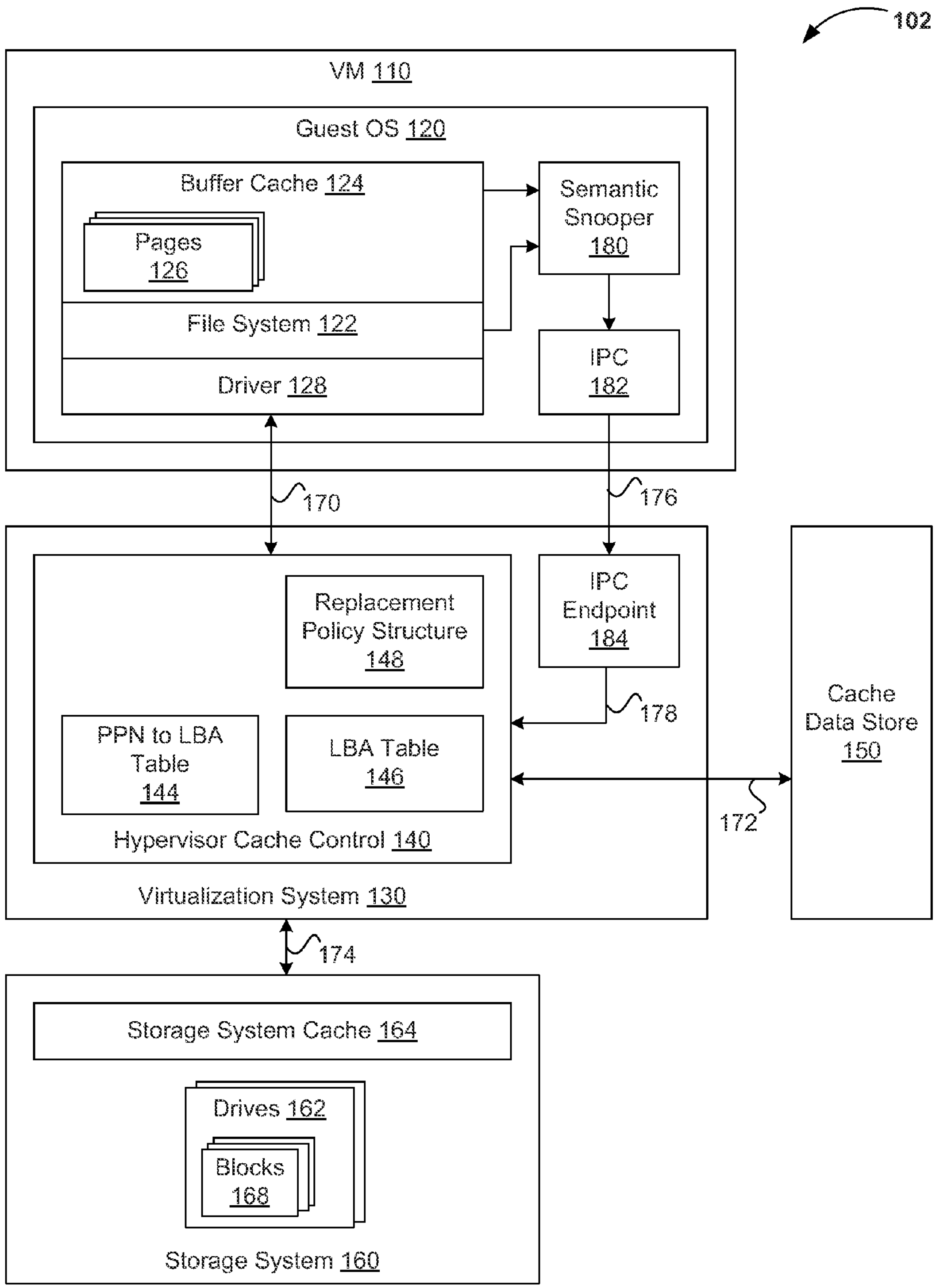

FIG. 1B is a block diagram of a virtualized computing system 102 configured to implement multi-level caching, according to another embodiment. In this embodiment, virtualized computing system 100 of FIG. 1A is augmented to include a semantic snooper 180 and inter-process communication (IPC) module 182. Semantic snooper 180 and IPC 182 may be implemented as a pseudo device driver installed within GOS 120. Pseudo device drivers are broadly known and applied in the art of virtualization. Semantic snooper 180 is configured to monitor operation of file system 122, including precisely which PPN is used to buffer which LBA. One exemplary mechanism by which semantic snooper 180 retrieves specific operational information about the buffer cache 124 is the well-known LINUX® operating system kprobe mechanism. Semantic snooper 180 may establish a trace on kernel function del_page_from_lru( ) which evicts a page from an LRU list of data cached within a LINUX® operating system buffer cache. At entry of this kernel function, semantic snooper 180 is passed the PPN of a victim page, which is then passed to hypervisor cache control 140 via IPC 182 and IPC endpoint 184. In this embodiment, hypervisor cache control 140 is able to explicitly track PPN usage within buffer cache 124 rather than infer PPN usage by tracking parameters associated with access requests.

A communication channel 176 is established between IPC 182 and IPC endpoint 184. In one embodiment, a shared memory segment comprises communication channel 176. IPC 182 and IPC endpoint 184 may implement an IPC system developed by VMware, Inc. of Palo Alto, Calif. and referred to as virtual machine communication interface (VMCI). In such an embodiment, IPC 182 comprises an instance of a client VMCI library, which implements IPC communication protocols to transmit data, such as PPN usage information, from VM 110 to virtualization system 130. Similarly, IPC endpoint 184 comprises a VMCI endpoint, which implements IPC communication protocols to receive data from VMCI library.

Figure 2:
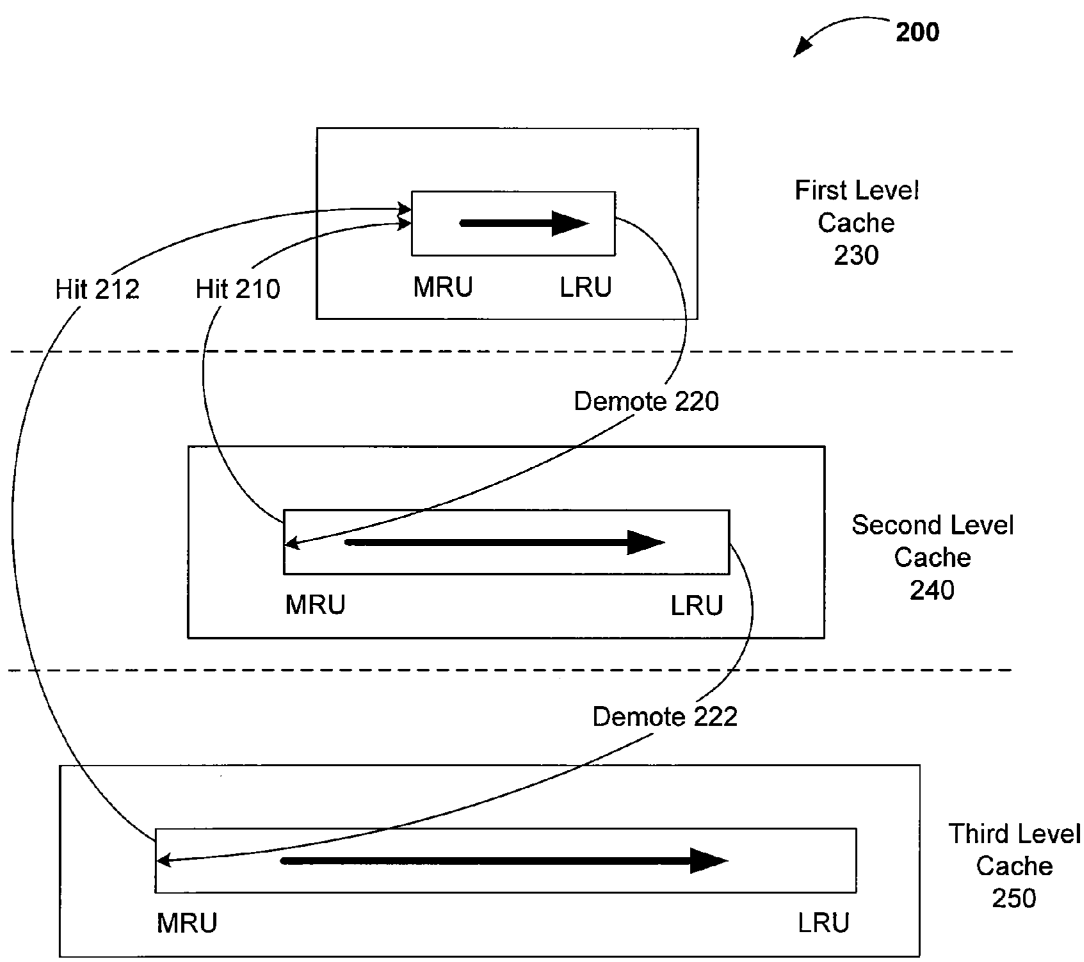
FIG. 2 illustrates data promotion and data demotion within a hierarchy of cache levels, according to one embodiment.

FIG. 2 illustrates data promotion and data demotion within a hierarchy of cache levels 200, according to one embodiment. Hierarchy of cache levels 200 includes a first level cache 230, a second level cache 240, and a third level cache 250. A request for new, un-cached data results in a cache miss in all three levels. The data is initially written to first level cache 230 and comprises most recently used data. If a certain unit of data, such as data associated with a block 168 of FIGS. 1A-1B, is not accessed for a sufficient length of time while other data is requested and stored in first level cache 230, then the unit of data eventually becomes the least recently used data and is in position to be evicted. Upon eviction, the unit of data is demoted to second level cache 240 via a demote operation 220. Initially after being demoted, the unit of data occupies the most recently used position within second level cache 240. The unit of data may similarly age within second level cache 240 until being demoted again, this time via demote operation 222, to third level cache 250. If the unit of data ages for a sufficiently long time, it is eventually evicted from third level cache 250. When a unit of data residing within third level cache 250 is requested, a cache hit promotes the data back to first level cache 230 via a hit operation 212. Similarly, if a unit of data residing within second level cache 240 is requested, a cache hit promotes the data back up to first level cache 230 via hit operation 210. Only one copy of a given unit of data is needed at each cache level, provided demotion operations 220, 222 are available and demotion information is available for each cache level.

In one embodiment, first level cache 230 comprises buffer cache 124 of FIGS. 1A-1B, second level cache 240 comprises cache data store 150 with hypervisor cache control 140, and third level cache 250 comprises storage system cache 164. Buffer cache 124 is free to implement any replacement policy. Hypervisor cache control 140 either infers page allocation and replacement performed by buffer cache 124 via monitoring of privileged instruction traps or is informed of the page allocation and replacement via semantic snooper 180.

In one embodiment, demoting a page of memory having a specified PPN is implemented via a copy operation that copies contents of the evicted page to a different page of machine memory associated with a different cache. In this embodiment, the copy operation needs to complete before new data is overwritten into the same PPN. For example, if buffer cache 124 evicts a page of data at a given PPN, then hypervisor cache control 140 demotes the page of data by copying contents of the page of data into cache data store 150. After the contents of the page are copied into cache data store 150, a read_page( ) operation that triggered eviction within the buffer cache 124 is free to overwrite the PPN with new data.

In another embodiment, demoting a page of memory having a specified PPN is implemented via a remapping operation that remaps the PPN to a new page of machine memory that is allocated for use as a buffer. The evicted page of memory may then be copied to cache data store 150 concurrently with a read_page( ) operation overwriting the PPN, which now points to the new page of memory. This technique advantageously enables the read_page( ) operation performed by buffer cache 124 to be performed concurrently with demoting the evicted page of data to cache data store 150. In one embodiment, PPN-to-LBA table 144 is updated after the evicted page is demoted.

Since all modem operating systems, including the WINDOWS® operating system, LINUX® operating system, SOLARIS™ operating system, and the BSD™ operating system implement a unified buffer cache and virtual memory system, events other than disk 10 can trigger page eviction, which makes it possible that the data in the replaced page can be changed for a non-IO purpose before being reused for 10 purposes again. As a result, the contents in the page are no longer consistent with the data at the corresponding disk location. To avoid demoting inconsistent data to cache data store 150, checksum-based data integrity may be implemented by hypervisor cache control 140. One technique for enforcing data integrity involves calculating an MD5 checksum and associating the checksum with each entry in PPN-to-LBA table 144 when an entry is added. During a readpage( ) operation, the MD5 checksum is recalculated and compared with the original checksum stored in PPN-to-LBA table 144. If there is a match, indicating the corresponding data is unchanged, then the page is consistent with LBA data and the page is demoted. Otherwise, a corresponding entry for the page in PPN-to-LBA table 144 is dropped.

On invocation of a write_page( ) operation, PPN-to-LBA table 144 and cache LBA table 146 are queried for a match on either PPN or LBA values specified in the write_page( ). Any matching entries in PPN-to-LBA table 144 and replacement policy data structure 148 should be invalidated or updated if a match is found. In addition, the associated MD5 checksum and the LBA (if the write is to a new LBA) in PPN-to-LBA table 144 should be updated or added accordingly. A new MD5 checksum may be calculated and associated with a corresponding entry within cache LBA table 146.

An alternative to using an MD5 checksum to detect page modification (consistency), involves protecting certain pages with read-only MMU protection, so that any modifications can be directly detected. This approach is strictly cheaper than MD5 checksum because only modified pages generate additional work when a read-only violation is invoked within the context of a hypervisor trap, and only for those modified pages. By contrast, the checksum approach requires a checksum calculation twice for each page.

Many modem operating systems, such as the LINUX® operating system, manage buffer cache 124 and overall virtual memory in a unified system. This unification makes precisely detecting all page evictions based on IO access more difficult. For example, suppose a certain page is allocated for storage mapping to hold a unit of data fetched using read_page( ). At some point, guest OS 120 could choose to use the page for some non-IO purpose or for constructing a new block of data that will eventually be written to disk. In this case, there is no obvious operation (such as read_page( )) that will tell the hypervisor that the previous page contents are being evicted.

By adding page protection in the hypervisor, a storage-mapped page may be detected when it is first modified if a cause for the modification can be inferred. If the page is being modified so that an associated block on disk can be updated, then there is no page eviction. However, if the page is being modified to contain different data for a different purpose, then the previous contents are being evicted. Certain page modifications are consistently performed by certain operating systems in conjunction with a page eviction. These modifications being performed can therefore be used as indicators of a page eviction. Two of such modifications include page zeroing by GOS 120 and page protection or mapping changes by GOS 120.

Page zeroing is commonly implemented by an operating system prior to allocating a page to a new requestor. Page zeroing advantageously avoids accidentally sharing data between processes. Page zeroing may also be detected by the VMM to infer page eviction by observing page zeroing activities in GOS 120. Any technically feasible technique may be used to detect page zeroing, including existing VMM art that implements pattern detection.

Page protection or virtual memory mapping changes to a particular PPN indicate that GOS 120 is repurposing a corresponding page. For example, pages used for memory-mapped I/O operations may have a particular protection setting and virtual mapping. Changes to either protection or virtual mapping may indicate GOS 120 has reallocated the page for a different purpose, indicating that the page is being evicted.

Figure 3A:
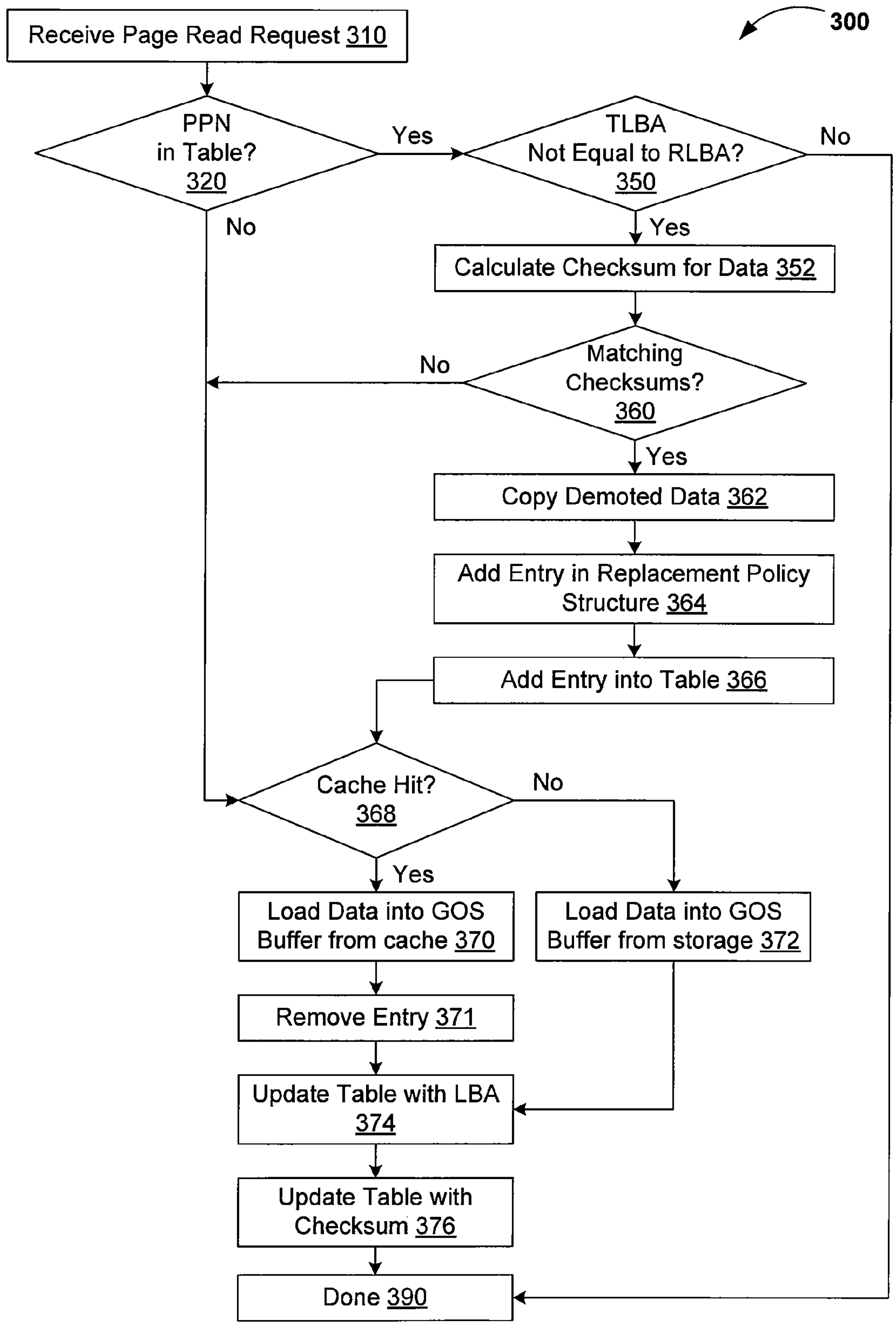
FIGS. 3A and 3B are each a flow diagram of method steps, performed by a hypervisor cache, for responding to a read request that targets a storage system.
Figure 3B:
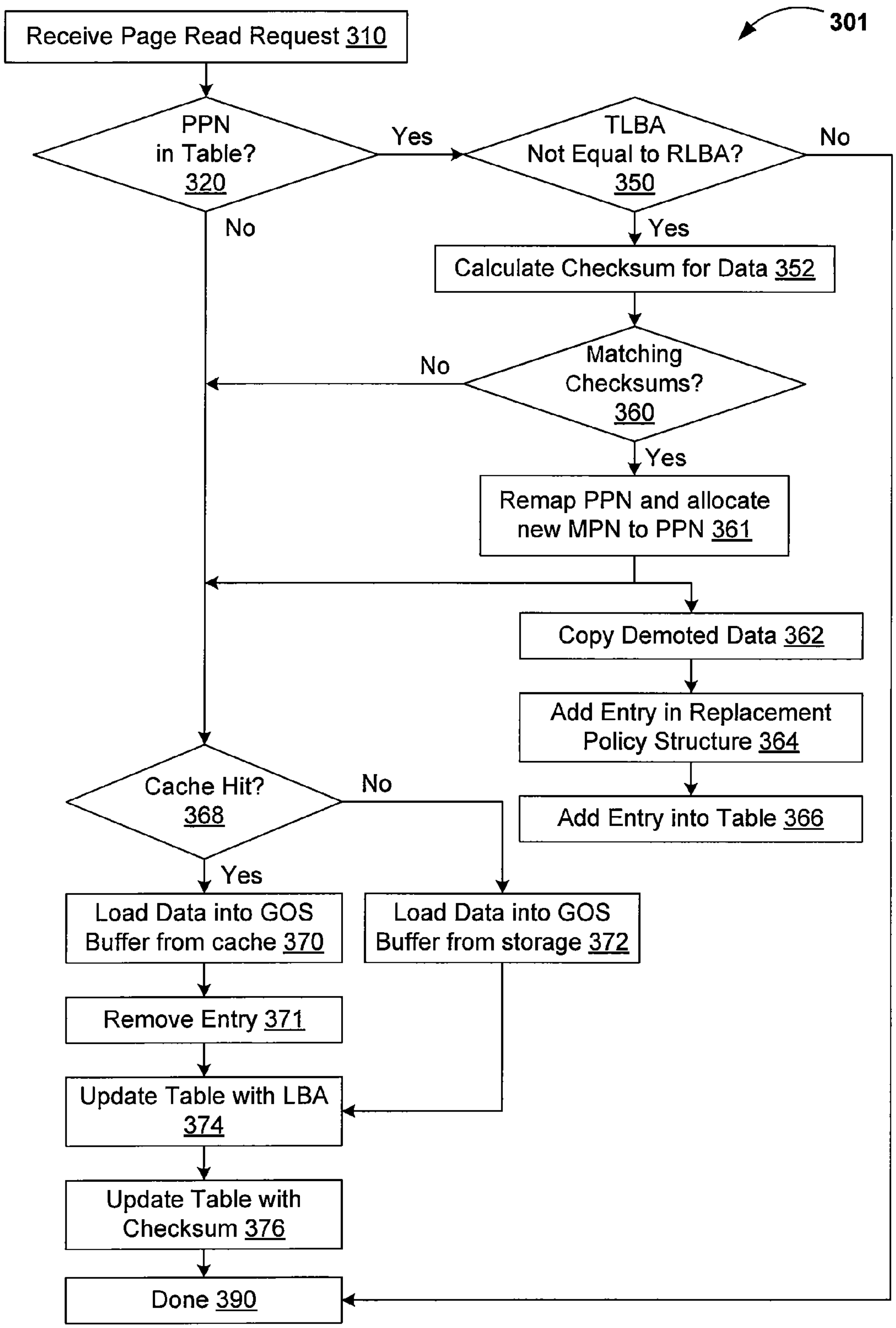

FIGS. 3A and 3B are each a flow diagram of method, performed by a hypervisor cache, for responding to a read request that targets a storage system. FIG. 3B is related to FIG. 3A, but shows an optimization in which certain steps can proceed in parallel. Although the method steps are described in conjunction with the system of FIGS. 1A and 1B, it should be understood that there are other systems in which the method steps may be carried out without departing the scope and spirit of the present invention. In one embodiment, the hypervisor cache comprises hypervisor cache control 140 and cache data store 150.

Method 300 shown in FIG. 3A begins in step 310, where the hypervisor cache receives a page read request comprising a request PPN, device handle ("deviceHandle"), and a read LBA (RLBA). The page read request may also include a length parameter ("len"). If, in step 320, the hypervisor cache determines that the request PPN is present in PPN-to-LBA table 144 of FIGS. 1A-1B, the method proceeds to step 350. In one embodiment, PPN-to-LBA table 144 comprises a hash table that is indexed by PPN, and determining whether the request PPN is present is implemented using a hash lookup.

If, in step 350, the hypervisor cache determines that an LBA value stored in PPN-to-LBA table 144 associated with the request PPN (TLBA) is not equal to the RLBA, the method proceeds to step 352. The state where RLBA is not equal to TLBA indicates that the page stored at the request PPN is being evicted and may need to be demoted. In step 352, the hypervisor cache calculates a checksum for data stored at the specified PPN. In one embodiment, an MD5 checksum is computed as the checksum for the data.

If, in step 360, the hypervisor cache determines whether the checksum computed in step 352 matches a checksum for the PPN stored as an entry in PPN-to-LBA table 144. If so, the method proceeds to step 362. Matching checksums indicate that the data stored at the request PPN is consistent and may be demoted. In step 362, the hypervisor cache copies the data stored at the request PPN to cache data store 150. In step 364, the hypervisor cache adds an entry for the copied data to replacement policy data structure 148, indicating that the data is present within cache data store 150 and subject to an associated replacement policy. If an LRU replacement policy is implemented, then the entry is added to the head of an LRU list residing within replacement policy data structure 148. In step 366, the hypervisor cache adds an entry to cache LBA table 146, indicating that data for the LBA may be found in cache data store 150. Steps 362-366 depict a process for demoting a page of data referenced by the request PPN.

In step 368, the hypervisor cache checks cache data store 150 and determines if the requested data is stored in cache data store 150 (i.e., a cache hit). If, in step 368, the hypervisor cache determines that the requested data is a cache hit within cache data store 150, the method proceeds to steps 370 and 371, where the hypervisor cache loads the requested data into one or more pages referenced by the request PPN from cache data store 150 (step 370) and the hypervisor cache removes an entry corresponding to the cache hit from cache LBA table 146 and a corresponding entry within the replacement policy data structure 148 (step 371). At this point, it should be understood that the data associated with the cache hit needs to reside within the buffer cache 124 to maintain exclusivity between buffer cache 124 and cache data store 150. In step 374, the hypervisor cache updates the PPN-to-LBA table 144 to reflect the read LBA associated with the request PPN. In step 376, the hypervisor cache updates the PPN-to-LBA table 144 to reflect a newly calculated checksum for the requested data associated with the request PPN. The method terminates in step 390.

If, in step 368, the hypervisor cache determines that the requested data is not a cache hit within cache data store 150, the method proceeds to step 372, where the hypervisor cache loads the requested data into one or more pages referenced by the request PPN from storage system 160. After step 372, steps 374 and 376 are executed in the manner described above.

Returning to step 320, if the hypervisor cache determines that the request PPN is not present in PPN-to-LBA table 144 of FIGS. 1A-1B, the method proceeds to step 368, where as described above the hypervisor cache checks cache data store 150 and determines if the requested data is stored in cache data store 150 (i.e., a cache hit), and executes subsequent steps as described above.

Returning to step 350, if the hypervisor cache determines that the TLBA value stored in PPN-to-LBA table 144 is equal to the RLBA, the method terminates in step 390.

Returning to step 360, if the checksum computed in step 352 does not match a checksum for the PPN stored as an entry in PPN-to-LBA table 144, then the method proceeds to step 368. This mismatch provides an indication that page data has been changed and should not be demoted.

In method 300 shown in FIG. 3A, the step of loading data into buffer cache 124 (step 370 or step 372) is carried out after a page of data referenced by the request PPN has been demoted. In other embodiments, such as method 301 shown in FIG. 3B, it should be recognized that the step of loading data into buffer cache 124 (step 370 or step 372) may be carried out in parallel with the step of demoting a page of data referenced by the request PPN. This is achieved by having the hypervisor cache execute the decision block in step 368 and steps subsequent thereto in parallel with step 362, after the hypervisor cache determines in step 360 that the checksum computed in step 352 matches the checksum for the PPN stored as an entry in PPN-to-LBA table 144 and the hypervisor cache, in step 361, remaps the machine page that is referenced by the request PPN to a different PPN and allocates a new machine page to the request PPN as described above.

Figure 4:
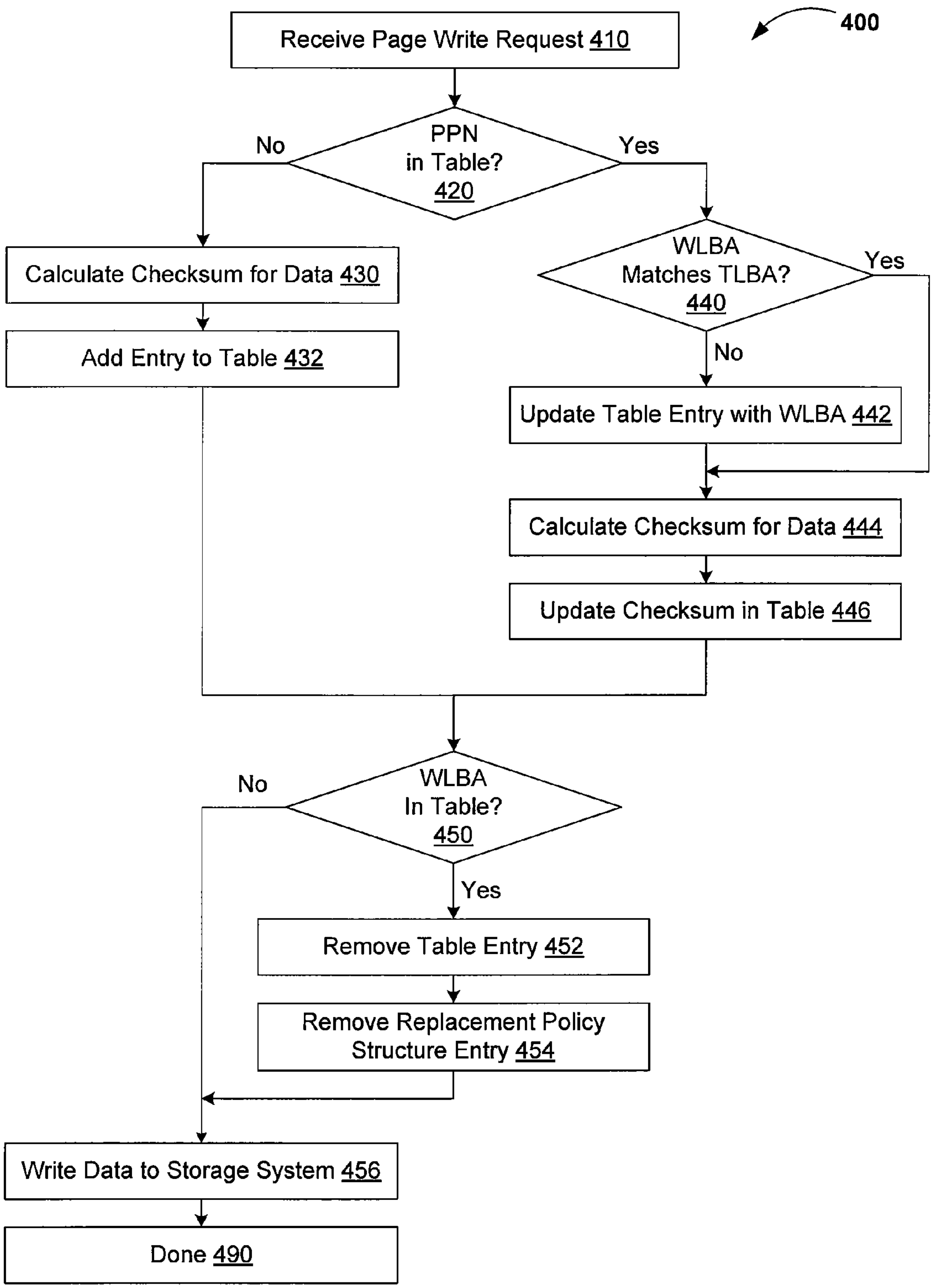
FIG. 4 is a flow diagram of method steps, performed by a hypervisor cache, for responding to a write request that targets a storage system.

FIG. 4 is a flow diagram of method 400, performed by a hypervisor cache, for responding to a write request that targets a storage system. Although the method steps are described in conjunction with the system of FIGS. 1A and 1B, it should be understood that there are other systems in which the method steps may be carried out without departing the scope and spirit of the present invention. In one embodiment, the hypervisor cache comprises hypervisor cache control 140 and cache data store 150.

Method 400 begins in step 410, where the hypervisor cache receives a page write request comprising a request PPN, device handle ("deviceHandle"), and a write LBA (WLBA). The page read request may also include a length parameter ("len"). If, in step 420, the hypervisor cache determines that the request PPN is present in PPN-to-LBA table 144 of FIGS. 1A-1B, then the method proceeds to step 440. In one embodiment, PPN-to-LBA table 144 comprises a hash table that is indexed by PPN, and determining whether the request PPN is present is implemented using a hash lookup. The hash lookup provides either an index to a matching entry or indicates that the PPN is not present.

If, in step 440, the hypervisor cache determines that the WLBA does not match an LBA value stored in PPN-to-LBA table 144 associated with the request PPN (TLBA), the method proceeds to step 442, where the hypervisor cache updates PPN-to-LBA table 144 to reflect that WLBA is associated with the request PPN. In step 444, the hypervisor cache calculates a checksum for the write data referenced by the request PPN. In step 446, the hypervisor cache updates PPN-to-LBA table 144 to reflect that the request PPN is characterized by the checksum calculated in step 444.

Returning to step 440, if the hypervisor cache determines that the WLBA does match a TLBA associated with the request PPN, the method proceeds to step 444. This mismatch provides an indication that the entry reflecting WLBA already exists within PPN-to-LBA table 144 and the entry needs an updated checksum for the corresponding data.

Returning to step 420, if the hypervisor cache determines that the request PPN is not present in PPN-to-LBA table 144 of FIGS. 1A-1B, the method proceeds to step 430, where the hypervisor cache calculates a checksum for the data referenced by the request PPN. In step 432, the hypervisor cache adds an entry to PPN-to-LBA table 144, where the entry reflects that the request PPN is associated with WLBA, and includes the checksum calculated in step 430.

Step 450 is executed after step 432 and after step 444. If, in step 450, the hypervisor cache determines that the WLBA is present in cache LBA table 146, the method proceeds to step 452. The presence of the WLBA in cache LBA table 146 indicates that the data associated with the WLBA is currently cached within cache data store 150 and should be discarded from cache data store 150 because this same data is present within buffer cache 124. In step 452, the hypervisor cache removes a table entry in cache LBA table 146 corresponding to the WLBA. In step 454, the hypervisor cache removes an entry corresponding to the WLBA from replacement policy data structure 148. In step 456, the hypervisor cache writes the data referenced by the request PPN to storage system 160. The method terminates in step 490.

If, in step 450, the hypervisor cache determines that the WLBA is not present in cache LBA table 146, the method proceeds to step 456 because there is nothing to discard from cache LBA table 146.

In sum, a technique for efficiently managing hierarchical cache storage within a virtualized computing system is disclosed. A buffer cache within a guest operating system provides a first caching level, and a hypervisor cache provides a second caching level. Additional caches may provide additional caching levels. When a given unit of data is loaded and cached by the guest operating system into the buffer cache, the hypervisor cache records related state but does not actually cache the unit of data. The hypervisor cache only caches the unit of data when the buffer cache evicts the unit of data, triggering a demotion operation that copies the unit of data to the hypervisor cache. If the hypervisor cache receives a request that is a cache hit, then the hypervisor cache removes a corresponding entry because that indicates that the unit of data already resides within the buffer cache.

One advantage of embodiments of the present invention is that data within a hierarchy of caching levels only needs to reside at one level, which improves overall efficiency of storage within the hierarchy. Another advantage is that certain embodiments may be implemented transparently with respect to the guest operating system.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computing system having a virtual machine (VM) running therein, a method for caching units of data between a first caching level buffer and a second caching level buffer, said method comprising:

in response to receiving a request to store contents of a first storage block into a physical page of the first caching level buffer associated with a first physical page number (PPN), determining that a unit of data cached in the first caching level buffer can be demoted to the second caching level buffer;

demoting the unit of data to the second caching level buffer by copying the unit of data from the first caching level buffer to the second caching level buffer;

updating state information of units of data cached in the first and second caching level buffers to reflect that the demoted unit of data does not reside in the first caching level buffer and that the demoted unit of data resides in the second caching level buffer; and storing the contents of the first storage block into the first caching level buffer at the first PPN, wherein the demoting of the unit of data and the storing of the contents of the first storage block are carried out in parallel with each other, and preserve exclusive caching between the first caching level buffer and the second caching level buffer.

2. The method of claim 1, wherein said determining whether a unit of data can be demoted comprises:

determining that the unit of data is consistent with a second storage block to which the unit of data is mapped.

3. The method of claim 2, wherein said determining that the unit of data is consistent with the second storage block to which the unit of data is mapped comprises:

determining that a recorded checksum associated with the unit of data matches a checksum calculated on the second storage block.

4. The method of claim 1, wherein copying a unit of data comprises:

remapping the first PPN to a new physical page; and copying contents of the first PPN into the second level cache buffer.

5. The method of claim 1, further comprising:

in response to receiving a request to store contents of a physical page of a second level cache buffer associated with a second PPN into a second storage block, determining whether the second PPN is present within a data structure that maps physical page numbers to storage block addresses;

upon determining that the second PPN is not present, adding an entry associated with the second PPN to the data structure;

upon determining that the second PPN is present, updating the data structure; and storing the contents of the second PPN into the second storage block.

6. The method of claim 5, wherein said adding the entry comprises:

calculating a write data checksum on the contents of the second PPN; and associating the second PPN with a storage address of the second storage block and the write data checksum.

7. The method of claim 5, wherein said updating the data structure comprises:

calculating a write data checksum on the contents of the second PPN; and associating the second PPN with a storage address of the second storage block and the write data checksum.

8. The method of claim 1, wherein the contents of the first storage block are copied from the second caching level buffer into the first caching level buffer at the first PPN and wherein updating state information includes removing the first storage block from the second caching level buffer.

9. The method of claim 1, wherein the contents of the first storage block are copied from the first storage block into the first caching level buffer at the first PPN.

10. The method of claim 1, further comprising detecting a page eviction event at the first caching level buffer and selecting a physical page that is undergoing page eviction as the physical page of the first caching level buffer associated with the first PPN.

11. The method of claim 10, wherein the page eviction event of a physical page is detected when the physical page is being zeroed.

12. The method of claim 10, wherein the page eviction event of a physical page is detected when the physical page undergoes a change in page protection or mapping.

13. The method of claim 10, wherein the page eviction event of a physical page is detected by monitoring usage of physical pages that are part of the first caching level buffer.

14. The method of claim 13, wherein the monitoring is performed by installing a trace on a page eviction function used by an operating system of the VM.

15. A non-transitory computer-readable storage medium comprising instructions which, when executed in a virtualized computing system having a virtual machine (VM) running therein and multiple caching levels including a first caching level buffer controlled by a guest operating system of the VM and a second caching level buffer controlled by a system software of the virtualized computing system, cause the virtualized computing system to perform the steps of:

receiving a request to store contents of a first storage block into a physical page of the first caching level buffer associated with a physical page number (PPN);

determining in response to the request that a unit of data cached in the first caching level buffer can be demoted to the second caching level buffer;

demoting the unit of data to the second caching level buffer by copying the unit of data from the first caching level buffer to the second caching level buffer;

updating state information of units of data cached in the first and second caching level buffers to reflect that the demoted unit of data does not reside in the first caching level buffer and that the demoted unit of data resides in the second caching level buffer; and storing the contents of the first storage block into the first caching level buffer at the PPN, wherein the demoting of the unit of data and the storing of the contents of the first storage block are carried out in parallel with each other, and preserve exclusive caching between the first caching level buffer and the second caching level buffer.

16. The non-transitory computer-readable storage medium of claim 15, wherein the instructions which, when executed in a virtualized computing system, cause the virtualized computing system to perform the further steps of:

in response to receiving a request to store contents of a physical page of a second level cache buffer associated with a second PPN into a second storage block, determining whether the second PPN is present within a data structure that maps physical page numbers to storage block addresses;

upon determining that the second PPN is not present, adding an entry associated with the second PPN to the data structure;

upon determining that the second PPN is present, updating the data structure; and storing the contents of the second PPN into the second storage block.

17. A virtualized computing system having a virtual machine (VM) running therein, the virtualized computing system comprising multiple caching levels including a first caching level buffer controlled by a guest operating system of the VM and a second caching level buffer controlled by a system software of the virtualized computing system, wherein the system software of the virtualized computing system is configured to:

receive a request to store contents of a first storage block into a physical page of the first caching level buffer associated with a physical page number (PPN);

determine in response to the request that a unit of data cached in the first caching level buffer can be demoted to the second caching level buffer;

demote the unit of data to the second caching level buffer by copying the unit of data from the first caching level buffer to the second caching level buffer;

update state information of units of data cached in the first and second caching level buffers to reflect that the demoted unit of data does not reside in the first caching level buffer and that the demoted unit of data resides in the second caching level buffer; and store the contents of the first storage block into the first caching level buffer at the PPN, wherein the demoting of the unit of data and the storing of the contents of the first storage block are carried out in parallel with each other, and preserve exclusive caching between the first caching level buffer and the second caching level buffer.

18. The method of claim 1, wherein the first and second caching level buffers have no duplicated data between them.

19. The non-transitory computer-readable storage medium of claim 15, wherein the first and second caching level buffers have no duplicated data between them.

20. The system of claim 18, wherein the first and second caching level buffers have no duplicated data between them.

* * * * *